United States Patent
Li et al.

(10) Patent No.: US 11,238,037 B2
(45) Date of Patent: Feb. 1, 2022

(54) DATA SEGMENT-BASED INDEXING

(71) Applicant: INTERNATIONAL BUSINESS MACHINES CORPORATION, Armonk, NY (US)

(72) Inventors: Shuo Li, Beijing (CN); Peng Hui Jiang, Beijing (CN); ShengYan Sun, Beijing (CN); Xin Peng Liu, Beijing (CN); Xiaobo Wang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/734,993

(22) Filed: Jan. 6, 2020

(65) Prior Publication Data

US 2021/0209103 A1   Jul. 8, 2021

(51) Int. Cl.
*G06F 16/24* (2019.01)
*G06F 16/2453* (2019.01)
*G06F 16/22* (2019.01)

(52) U.S. Cl.
CPC ...... *G06F 16/24532* (2019.01); *G06F 16/221* (2019.01)

(58) Field of Classification Search
CPC ................................ G06F 16/24532
USPC ........................................... 707/791
See application file for complete search history.

(56) References Cited

U.S. PATENT DOCUMENTS

| 8,738,593 | B2 | 5/2014 | Gupta | |
| 2007/0239772 | A1 | 10/2007 | Gupta | |
| 2011/0252018 | A1 | 10/2011 | Bhose et al. | |
| 2016/0239527 | A1* | 8/2016 | Jang | G06F 40/157 |
| 2017/0351721 | A1* | 12/2017 | le Mar | G06F 16/24542 |
| 2019/0079968 | A1* | 3/2019 | Griffith | G06F 16/2282 |
| 2019/0179928 | A1* | 6/2019 | Tiwari | G06F 16/316 |
| 2019/0340273 | A1* | 11/2019 | Raman | G06F 16/28 |

(Continued)

OTHER PUBLICATIONS

Aydin, Berkay, Vijay Akkineni and Ratal A Angryk "Modeling and Indexing Spatiotemporal Trajectory Data in Non-Relational Databases." (2016). 30 pages.

(Continued)

*Primary Examiner* — Syling Yen

(74) *Attorney, Agent, or Firm* — William Hartwell; Matthew M. Hulihan; Heslin Rothenberg Farley & Mesiti PC

(57) ABSTRACT

Data segment-based indexing includes identifying data segments of a column of a database based on a data distribution of data of the column, indexing the data segments, including, for each data segment, determining an index type and creating an index of the determined index type, and building a composite link between indexes of a common index type, which indexes of the common index type include a created index, from indexing the data segments of the column, of the common index type and at least one other index, of the common index type, which is for other data segment(s), of other column(s) of the database, that have been indexed using the common index type. The composite link provides for parallel searching against the indexes in the group to search corresponding different data segments, in different columns of the database, indexed using the common index type.

20 Claims, 9 Drawing Sheets

(56) References Cited

U.S. PATENT DOCUMENTS

2020/0341997 A1* 10/2020 Spitz .................. G06F 16/2379

OTHER PUBLICATIONS

Mell, Peter, et al., "The NIST Definition of Cloud Computing", NIST Special Publication 800-145, Sep. 2011, Gaithersburg, MD, 7 pgs.

"Secondary Indexing", Apache Phoenix, retrieved on Jan. 6, 2020 from the Internet URL: <http://phoenix.apache.org/secondary_indexing.html>, 12 pgs.

"Geospatial Queries", MongoDB Manual, retrieved on Jan. 6, 2020 from the Internet URL: <https://docs.mongodb.com/manual/geospatial-queries/>, 9 pgs.

"Find Restaurants with Geospatial Queries", MongoDB Manual, retrieved on Jan. 6, 2020 from the Internet URL: <https://docs.mongodb.com/manual/tutorial/geospatial-tutorial/>, 8 pgs.

"GeoJSON Objects", MongoDB Manual, retrieved on Jan. 6, 2020 from the Internet URL: <https://docs.mongodb.com/manual/reference/geojson/> 6 pgs.

"$geoWithin", MongoDB Manual, retrieved on Jan. 6, 2020 from the Internet URL: <https://docs.mongodb.com/manual/reference/operator/query/geoWithin/>, 5 pgs.

"$near", MongoDB Manual, retrieved on Jan. 6, 2020 from the Internet URL: <https://docs.mongodb.com/manual/reference/operator/query/near/>, 5 pgs.

"$geoIntersects", MongoDB Manual, retrieved on Jan. 6, 2020 from the Internet URL: <https://docs.mongodb.com/manual/reference/operator/query/geoIntersects/>, 5 pgs.

* cited by examiner

DATA SEGMENT-BASED INDEXING

BACKGROUND

Query-based searching and result reporting are widely used for handling user search requests. The practice of indexing database data to produce an index that can be used when searching provides improvements to search efficiency. Traditionally, consideration is given to the different columns of data involved, an index type for the index is selected, and an appropriate index is created. A search is performed by searching each search term using the index and combining intermediate results using logic operators, such as OR, AND, or NOT, as examples.

SUMMARY

Shortcomings of the prior art are overcome and additional advantages are provided through the provision of a computer-implemented method. The method identifies data segments of a column of a database, where identifying is based on a data distribution of data of the column. The method also indexes the data segments of the column. The indexing includes, for each data segment of the identified data segments of the column, determining an index type to use to index the data segment. The indexing also includes creating, for the data segment, an index of the determined index type to index the data segment. The method additionally includes building a composite link between indexes of a common index type. The indexes of the common index type include a created index, created from the indexing the data segments of the column, of the common index type and also at least one other index of the common index type. The at least one other index is for other data segment(s), of other column(s) of the database, that have been indexed using the common index type. The composite link provides for parallel searching against the indexes in the group of indexes to search corresponding different data segments, in different columns of the database, being indexed using the common index type.

Further, a computer system is provided that includes a memory and a processor in communication with the memory, wherein the computer system is configured to perform a method. The method identifies data segments of a column of a database, where identifying is based on a data distribution of data of the column. The method also indexes the data segments of the column. The indexing includes, for each data segment of the identified data segments of the column, determining an index type to use to index the data segment. The indexing also includes creating, for the data segment, an index of the determined index type to index the data segment. The method additionally includes building a composite link between indexes of a common index type. The indexes of the common index type include a created index, created from the indexing the data segments of the column, of the common index type and also at least one other index of the common index type. The at least one other index is for other data segment(s), of other column(s) of the database, that have been indexed using the common index type. The composite link provides for parallel searching against the indexes in the group of indexes to search corresponding different data segments, in different columns of the database, being indexed using the common index type.

Yet further, a computer program product including a computer readable storage medium readable by a processing circuit and storing instructions for execution by the processing circuit is provided for performing a method. The method identifies data segments of a column of a database, where identifying is based on a data distribution of data of the column. The method also indexes the data segments of the column. The indexing includes, for each data segment of the identified data segments of the column, determining an index type to use to index the data segment. The indexing also includes creating, for the data segment, an index of the determined index type to index the data segment. The method additionally includes building a composite link between indexes of a common index type. The indexes of the common index type include a created index, created from the indexing the data segments of the column, of the common index type and also at least one other index of the common index type. The at least one other index is for other data segment(s), of other column(s) of the database, that have been indexed using the common index type. The composite link provides for parallel searching against the indexes in the group of indexes to search corresponding different data segments, in different columns of the database, being indexed using the common index type.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Business data is increasingly managed by NoSQL and other types of databases, particularly when the data is used in cloud services. With the growth of big data, the distribution of data in a given database column can vary significantly, producing identifiable 'data segments' based on characteristics of the data values in the column. Use of single-type indexes built for the columns of data can be problematic when dealing with a heterogeneous distribution of data; different data segments of a column may be more efficiently searched using differing types of indexes. Data distribution can have a significant impact on the efficiency of data query handling using various index types, such as b+ tree, hash, map-reduce view, full text, and geospatial, as examples. Using a single index for the data of an entire column with a relatively heterogeneous data distribution involving several data segments may be sub-optimal, but this is not taken into account in modern search engines; conventional approaches do not consider the distribution of data in each of the data segments of the column, let alone relationships of data segments between multiple data columns, when indexing and searching indexes to process queries.

Figure 1:
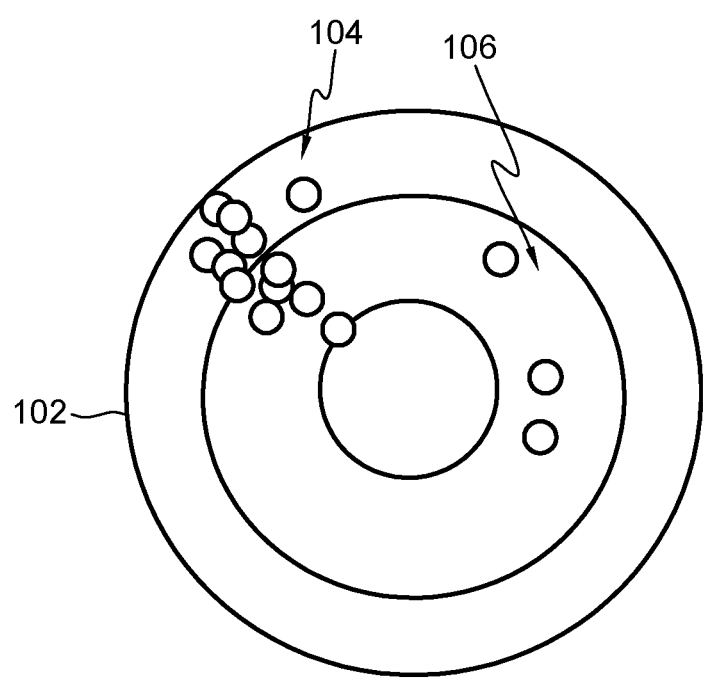
FIG. 1 illustrates an example of densely and sparsely distributed data.

FIG. 1 illustrates a simplified example of densely and sparsely distributed column data. Graph 102 plots on a three-ring chart various data points corresponding to locations of coffee shops. The majority of the data points are clustered toward the top left of the chart, in a group 104 of a densely distributed data, while three data points, group 106, are relatively sparsely distributed. The two groups 104 and 106 depict easily identifiable data segments of the column data—one segment for densely distributed data and one segment for sparsely distributed data, in this example. Segmentation in this example is identified visually, though in practice, various analyses, including statistical clustering analyses and others, may be employed to identify data segments based on distribution of data.

A search platform might query the data of FIG. 1 to identify a list of coffee shops. In practice, the column might contain information about millions of coffee shops. Searching against the densely distributed data segment 104 might be most efficient (e.g. fastest) using a particular index type (say, geospatial), whereas searching against the sparsely distributed data segment 106 might be most efficient using a different index type (say, attribute index).

Described herein are approaches for creating and using multiple indexes, composite linking of indexes for different data segments. Initially, an index could be created for each desired column according to an index type specified by an administrator or other user, such as a user responsible for the database. As more fully described herein, aspects can analyze the data values in each column and calculate a respective data distribution of each column. The data distribution informs data segments in the column's data values—that is, groups into which the values of the column can be segmented based on characteristic(s) of the data values. For each of the different data segments, aspects create an additional index of a selected index type using a best or optimal index type. In this manner, the initially selected index type is not taken as the best to use per se, but instead a proper index type is selected for each data segment based on what is deemed best suited for the particular segment. That index type could be the same or different from the type of index initially created.

Various approaches are possible for determining an optimal or best suited index type for a given data segment. Logistic regression is one. Machine learning is another, which could learn, based on training data and continual learning over time, which type of index is best suited for data segments of given characteristics. Learning can be based on trial and/or actual searches using different indexes of differing index types to determine the most suitable. And, as searches are performed on an ongoing basis in a production environment, performance results can be gathered and the system can track the effectiveness of the different index types for different data segments to identify which index types work best for segments of identifiable characteristics.

Aspects can also consolidate the indexing by index type across data segments from multiple columns and build composite links of multiple indexes across the multiple columns. A query predicate can select different index types for searching different data segments.

The index type to use for a given segment can change over time as the segment (i.e. data included therein) changes. Over time as data is added to and removed from a column, the index types used to index the various data segments of the column can change, as can the data segmentation itself, to re-index the data using a more suitable index type. This can ensure that any given data segment is indexed using an index type most efficient for searching the data of that segment. Processing of queries submitted for searching can use composite link(s) to perform parallel searching against the data indexes of a same/common index type. For instance, an engine to search all indexes of a given type (which indexes index data segments from multiple different columns) can leverage the composite link for efficient searching. These aspects can be transparent to the end user who submitted the query, and the user need not use a query hint or other additional function to use any particular index.

Accordingly, data segment-based indexing described herein can provide hybrid indexing using different index types for a single column based on its data distribution, consolidation of indexes across multiple columns for parallel searching of data segments, and dynamic re-indexing to change between different index type(s) based on the evolution of the data distribution of a column as data thereof changes.

Figure 2:
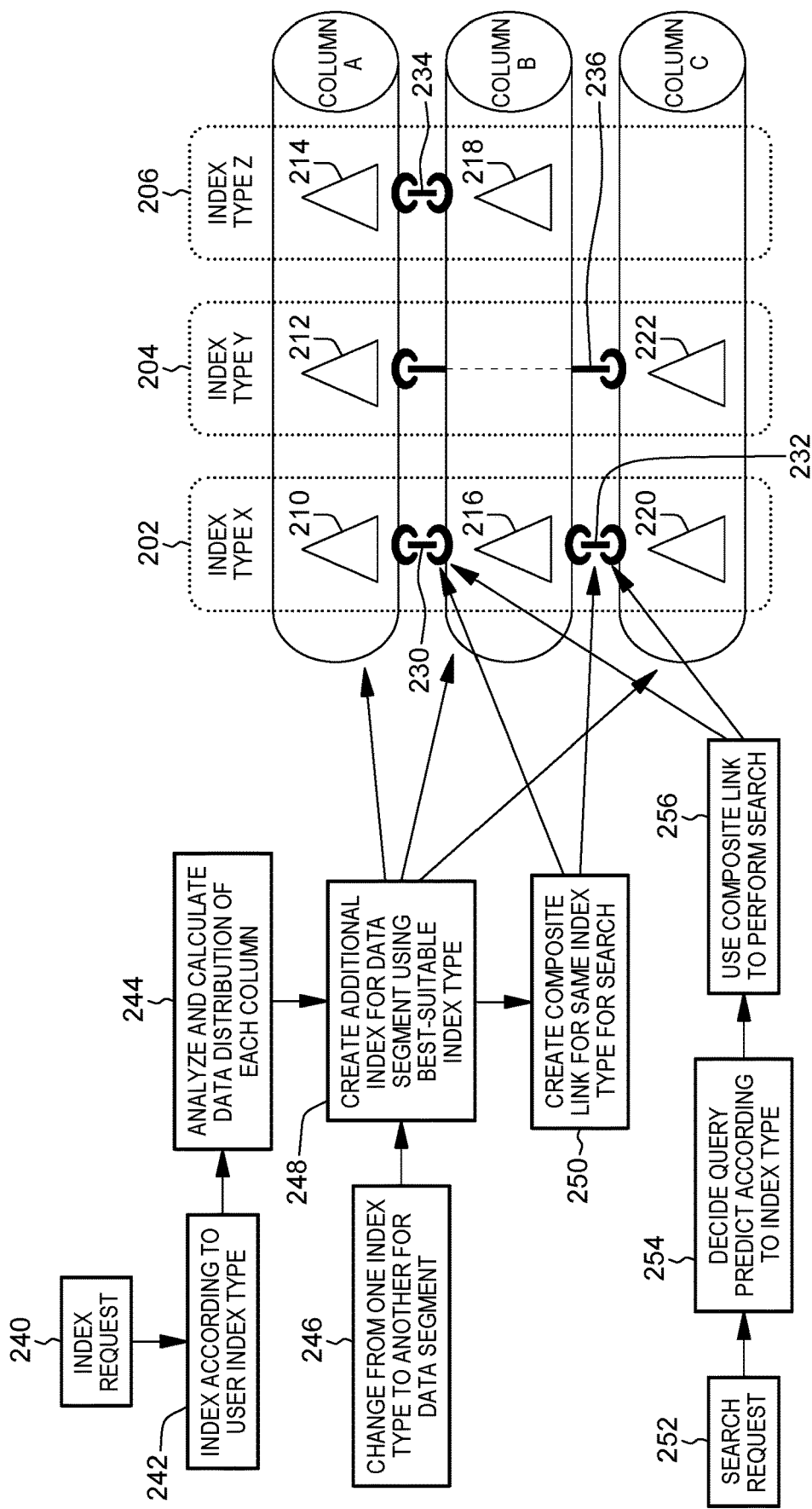
FIG. 2 depicts a conceptual overview of data segment-based indexing in accordance with aspects described herein.

FIG. 2 depicts a conceptual overview of data segment-based indexing in accordance with aspects described herein. The right side of FIG. 2 depicts three columns A, B, and C. The left side of FIG. 2 depicts an example process flow performed by one or more computers systems.

Initially, an index request 240 is submitted, for instance a request to an indexing system having access to data in a database. The index request includes a user indication of an index type to use to index column(s) of data. The process indexes (242) the data according to the user index type. The user index type could be one an administrator choses for a column, for example. At that point, the process analyzes and calculates (244) the data distribution of each column—A, B, and C. In this example, an analysis of the distribution of data in column A determines that column A includes three data segments 210, 212 and 214, while column B's data is segmented into segments 216 and 218, and column C's data is segmented into 220 and 222. The process creates (248), for each of the data segments, an additional index using the best-suitable index type for that segment, which may or may not be the same type as the initial index for the column. In situations where the best-suitable index type is the same for two or more disjoint data segments, then optionally a single index of that index type could be created to index the two or more segments.

In this manner, while a user specifies an initial index type to use to index all data of the column, indexing the data in the data segments of the column can automatically create, for a subset of the data of the column, i.e. a data segment, an additional index of a different index type than the initial index type. In the example of FIG. 2, the best suitable index types to use to index segments, 210, 212, and 214 are index type X (202), index type Y (204), and index type Z (206), respectively. Similarly for columns B and C, index type X is used to index segments 216 and 220, index type Z is used to index segment 218, and index type Y is used to index segment 222.

The process also creates (250) composite links for indexes of the same index type for searching. In this regard, indexes of a common type for data segments across columns are linked to facilitate searching. Composite links 230 and 232 conceptually link the indexes of segments 210, 216 and 220 from columns A, B, and C, respectively, which are all of index type X. Composite link 236 links the indexes of segments 212 and 222 of index type Y, and composite link 234 links the indexes of segments 214 and 218.

Over time, the data segments can change as data is added to or removed from the column. The data distribution could change such that the segmentation of the data in a column changes to produce new/different data segments and/or data within a given segment could change. In either case, a re-indexing may be desired, in which indexing of various data portions of a column is transformed (246) from one type to another on the basis that the new type better indexes data of the column.

As some point a search request 252 is submitted as a query string. The process decides (254) the query predicate according to the index type, in which each part of query string is determined and, for each column, it is determined what indexes and types are to be used in processing the query. A query predicate is a term in the query, and query terms inform about the columns involved in the search. Depending on what segments are to be searched, this can inform the indexes to be used in the searching. This in turn informs the index types of those indexes for the relevant segments. In general, the query processing can focus on only those indexes for the data segments having data relevant to the search.

Based on which indexes are to be searched, the query processing uses (256) composite link(s), with each linking indexes of a common type for parallel searching those indexes. In an example, a single search engine performs the parallel searching of the multiple indexes of the common index type.

Figure 3:
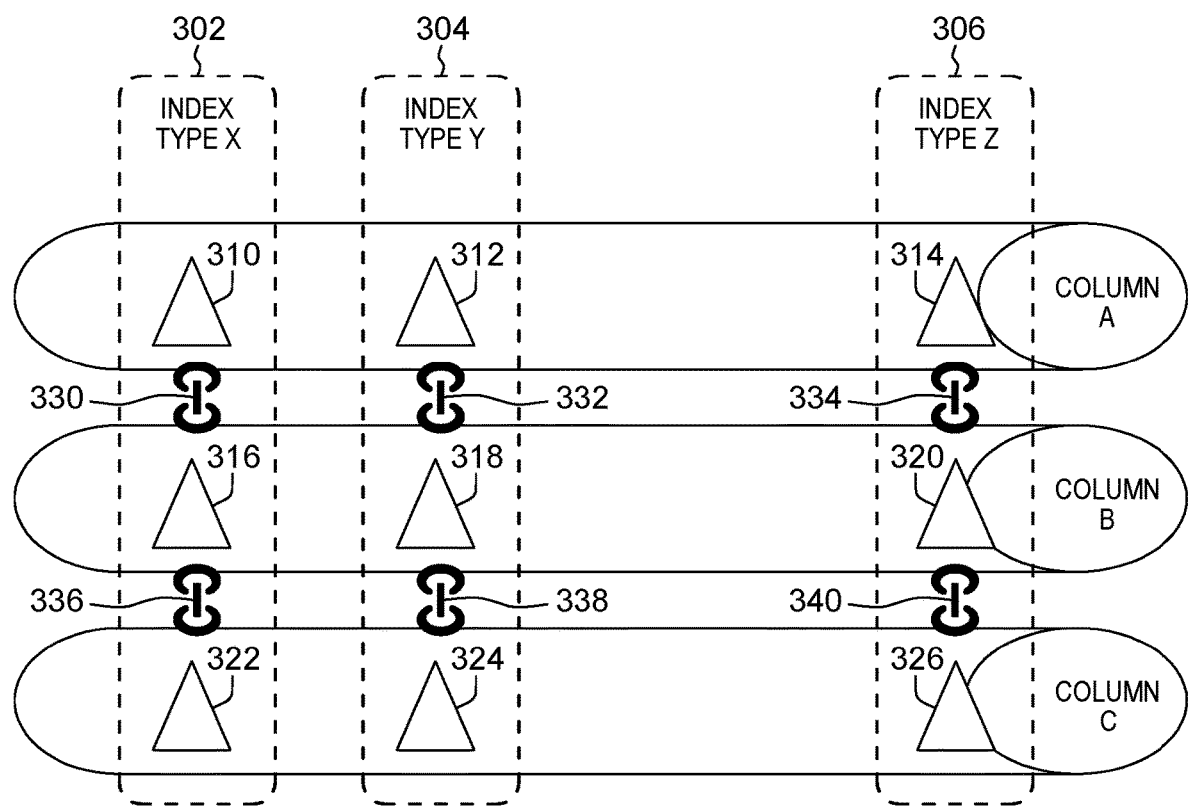
FIG. 3 depicts additional index creation for different data segments of a column, in accordance with aspects described herein.

As further details of the above, FIG. 3 depicts additional index creation for different data segments of a column, in accordance with aspects described herein. As noted, a process analyzes and calculates the data distribution of each column. Then, for each different data segment, the process creates an index for the data segment using an optimal index type, i.e. one that is taken to yield the fastest results when searching.

By way of the example of FIG. 3, column A includes data segments 310, 312, and 314 for which optimal index types are index type X 302, index type Y 304, and index type Z 306, respectively. Columns B has data segments 316, 318 and 320 indexed by index types X, Y, and Z, and column C has data segments 322, 324 and 326 indexed by index types X, Y, and Z respectively.

As noted, the process can identify, for each column of a database, the data segments of the column based on a data distribution of data of the column. For the different data segments, the process can also select an appropriate index type to use. In some examples, the performance of each of index type against this or other data is evaluated to identify an optimal index type. Over time, after several trials, the optimal index type can be determined. Additionally or alternatively, machine learning is performed in the background of query processing, to determine optimal index types for data segments of varying characteristics.

The process can therefore index the data segments of each column by determining, for each data segment of the identified data segments of the column, an index type to use to index the data segment, and creating, for the data segment, an index of the determined index type to index the data segment. The determination of the index type to use to index a data segment can include selecting, based on characteristics of the data segment, an optimal index type from a collection of available index types. The available index types could be those identified by machine learning based on processing queries over time. The index type to use could be one of the various optimal index types to use to index data segments of differing characteristics, such that the characteristics of any given data segment can dictate which of the optimal index types to use in indexing the given segment. Indexing the data in the data segments of the column can index different data segments of the column using different indexes of differing index types.

Continuing with FIG. 3, composite links 330 and 336 link the indexes for segments 310, 316, and 322 (index type X), while composite links 332 and 338 link the indexes for segments 312, 318 and 324 (index type Y) and composite links 334 and 340 link the indexes for segments 314, 320 and 326 (index type Z). The process can consolidate all index types detected in the various columns and build these composite links for multiple indexes. In this building of the composite links between indexes of a common index type, the indexes of the common index include a group of indexes for different segments of different columns. The composite link provides for parallel searching against the indexes in this group of indexes to search the corresponding different data segments, in different columns of the database, being indexed using the common index type. In this manner, if two data segments are indexed using a same index type, then one index engine can perform a parallel search using that link to search each of the indexes. This is in contrast to situations in which multiple different engines are used in searching different columns, which produces additional overhead.

Figure 4:
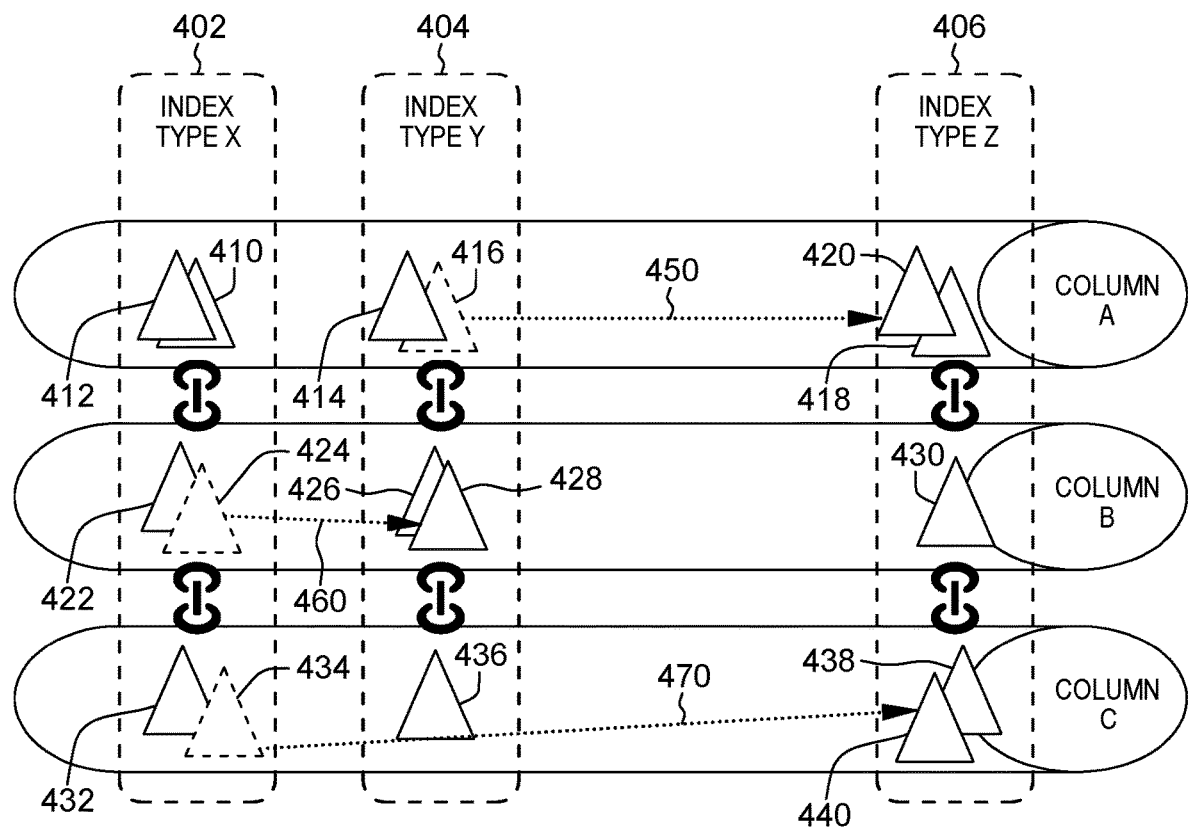
FIG. 4 illustrates an example of reindexing data segments based on changes to column data, in accordance with aspects described herein.

FIG. 4 illustrates an example of reindexing data segments based on changes to column data, in accordance with aspects described herein. Since data in a column can change over time, this can affect both the distribution of data (and therefore segmenting the data in the column), as well as the proper index type to index the different data segments of the column. Aspects can therefore reindex column data from time to time and transition from an index of one index type to an index of another, more-suitable index type based on addition and removal of data in the column and data segments thereof.

FIG. 4 depicts three transitions in index type used for indexing data segments. Column A includes data segments 410 and 412 (indexed using index type X 402), data segment 414 (indexed using index type Y 404), and data segment 418 (indexed using index type Z 406). Initially, column A also includes data segment 416 indexed using index type Y. Over time, changes to data segment 416 result in a reindexing of the data segment and transition 450 to index type Z for the changed data segment (represented as 420).

Similarly, column B is segmented into segments 422, 426 and 430, which are indexed using index types X, Y and Z, respectively, as well as data segment 424 which is initially indexed using index type X. Based on changes to data of the column and values included in the segment, the segment 424 is reindexed and the indexing transitions 460 to index type Y for the changed data segment (represented as 428). Column C is segmented into segments 432, 436 and 438, which are indexed using index types X, Y and Z, respectively, as well as data segment 434 which is initially indexed using index type X. Based on changes to data of the column and values included in the segment, the segment 434 is reindexed and the indexing transitions 470 to index type Z for the changed data segment (represented as 440).

The index type used to index a data segment can therefore transition from one type to another type based on additions, removals and other change in data of the column. One or more thresholds can be set for triggering a reindexing/transition procedure. An example threshold is a number of changes made to the column or data segment(s) thereof.

It is also noted that changes can inform a redistribution of data of the column, which redistribution can result in redistributing data into different data segments, creation of new data segment(s) and/or removal of other data segment(s), for instance. Based on changes to data of the column, which changes result in a changed data distribution and segmentation of data of the column, the process can then reindex a data segment of the column. The reindexing can determine, based at least on part on the changed distribution, to use a different index type than a current index type being used for the data segment.

Additional aspects provide for processing a query using, e.g., composite link(s) for parallel searching against the indexes in a group of indexes of a common type to search data segments, of multiple different columns, indexed using a common index type. In a particular approach for query handling, query searching is divided by dynamically determining using runtime estimation different column data segments, which informs the indexes to search. Query searching can be performed in parallel, as different index engines can be used to search indexes of different index types. For a given index type, searching against the indexes of that type can be performed in parallel through the composite links by a common search engine. Results can be delivered by the different engines responsible for searching the different index types to a master/coordinator to build a query response to the requesting user/entity.

Query processing can use a composite link for parallel searching against the indexes in a group of indexes (that use a common index type) to search data segments of multiple different database columns. The processing can use a single searching engine to search against the indexes in that group. Additionally, statistics about query hits and response times for the different segments and indexes used can be logged in order to assess effectiveness of the data segmentation and multi-indexing, as well as the index types selected for the different data segments.

Aspects described herein can provide better performance than existing methods by supporting multiple index types for corresponding data of a column, and linking between the segments of a common index type. The indexing and reindexing activities can be performed behind the scenes, transparent to end users, without a need to use SQL or NoSQL functions to perform these activities, and do not require changes on the application (user/querying) side.

Figure 5A:
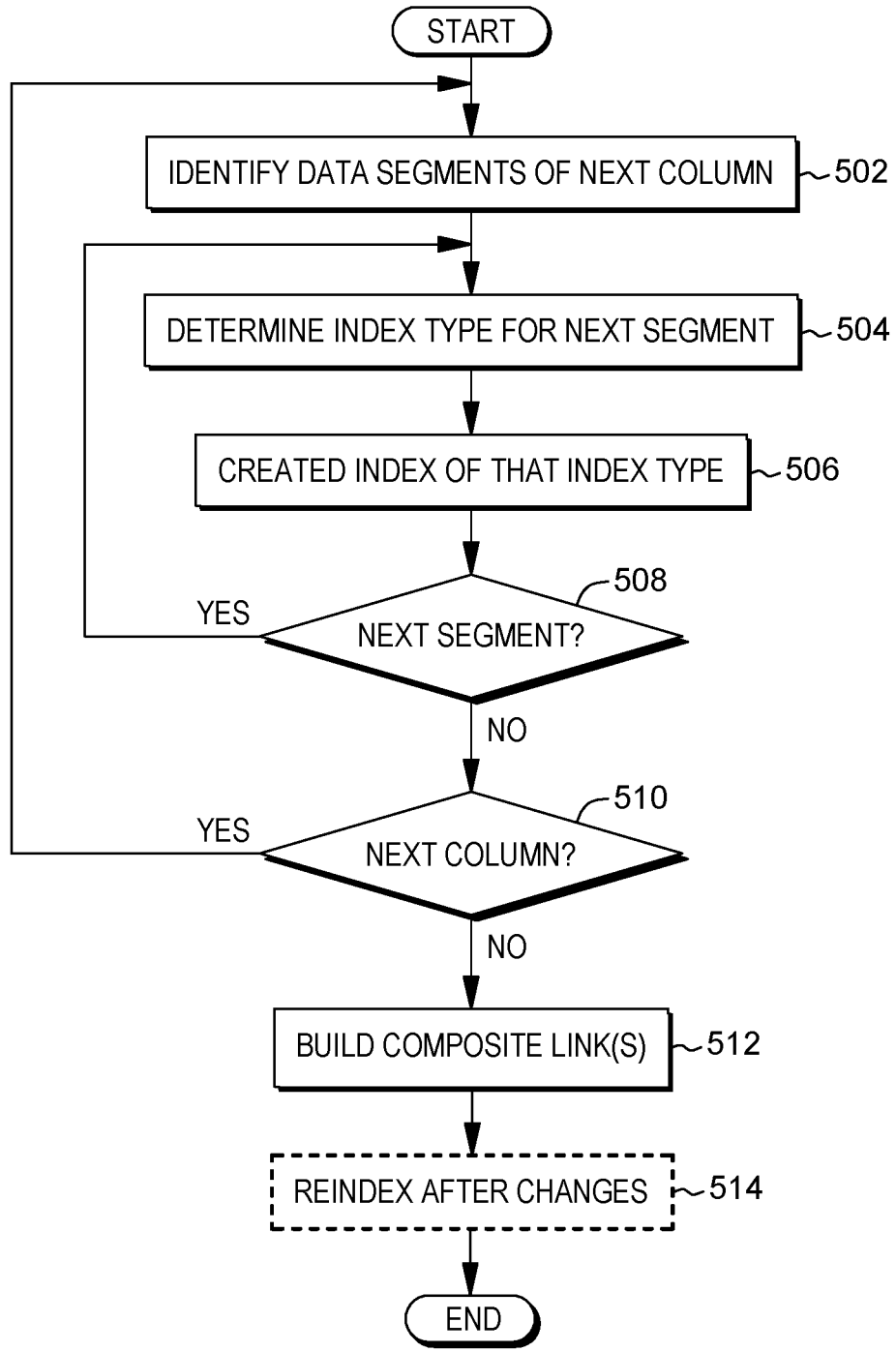
FIG. 5A depicts an example process for data segment-based indexing, in accordance with aspects described herein.

FIG. 5A depicts an example process for data segment-based indexing, in accordance with aspects described herein. In some examples, the process is performed by one or more computer systems, such as those described herein, which may include one or more indexer computer systems in communication with a database and/or one or more other computer systems.

The process begins by identifying (502) data segments of a column of a database, the identifying being based on a data distribution of data of the column. At this point, the process indexes the data segments of one or more columns using the optimal/best index type. Thus, the indexing selects a first column and the process continues by entering a loop for each data segment of the identified data segments of the column. The process determines (504) an index type to use to index the data segment, and creates (506), for the data segment, an index of the determined index type to index the data segment. The process determines (508) whether there is a next segment of the column to process. If so (508, Y), the process loops back to 504 to process the next data segment. Otherwise (508, N), the process determines (510) whether there is a next column of the database to process. It is noted that one, some, or all of the columns of the database may be selected for data segment-based indexing as described herein, and that, therefore, one or more columns may be excluded from such indexing if desired.

If at 510 it is determined that there is a next column to process (510, Y) the process loops back to 502 to identify data segments of the next column to process and continue with the process of FIG. 5A. Otherwise (510, N), the indexing ends, at which point queries may be processed.

Determining the index type to use to index the data segment can include selecting, based on characteristics of the data segment, an optimal index type from a collection of available index types. The available index types can be identified by machine learning, based on processing queries over time, as the optimal index types to use to index data segments of differing characteristics. The index types can be 'optimal' under different circumstances, and characteristics of a given data segment can dictate which of the optimal index types to use for the given segment.

The indexing of the data in the data segments of a column can index a first data segment of the column using a first index of a first index type and index a second data segment of the column using a second index of a second index type, with the first and second indexes being different indexes. Moreover, the first and second index types can be different index types.

In some examples, a user/admin has specified an initial index type to use to index all data of a given column, and the indexing of the data in the data segments of the column as undertaken in the process of FIG. 5A automatically creates, for a subset of the data of the column, an additional index of a different index type than the initial index type. It is possible, however, that the optimal index type to index a given data segment happens to be the type initially selected by the user.

After indexing (502 through 510), the process of FIG. 5A continues by building a composite link between indexes of a common/same index type, where the indexes of the common index type includes a created index, created from the indexing the data segments of one column, of the common index type and at least one other index of the common index type, the at least one other index being for one or more other data segments, of one or more other columns of the database, that have been indexed using the common index type. The composite link provides for parallel searching against the indexes in this group of indexes to search corresponding different data segments, in different columns of the database, being indexed using the common index type.

Optional reindexing 512 can also be performed. Based on changes to data of a column of the database, where the changes result in a changed data distribution of data of the column, the process can reindex one or more data segments of the column, and the reindexing can determine, based at least on part on the changed distribution, to use a different index type than a current index type being used for the data segment. Reindexing could return the process to 502 to reprocess the columns.

Figure 5B:
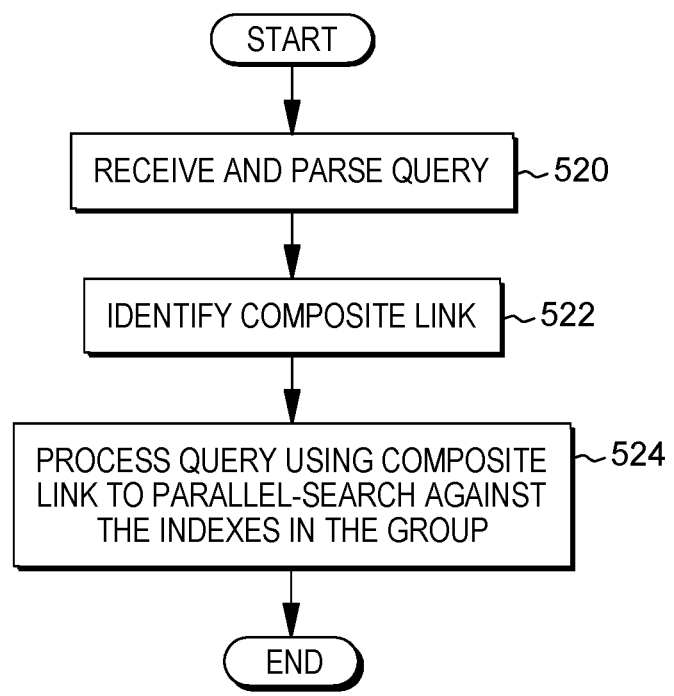
FIG. 5B depicts an example process for query handling in accordance with aspects described herein.

FIG. 5B depicts an example process for query handling in accordance with aspects described herein. In some examples, the process is performed by one or more computer systems, such as those described herein, which may include one or more computer systems in communication with a database and/or one or more other computer systems. The process receives and parses (520) the query, and identifies (522) a composite link to be followed that links a group of indexes of the same index type for multiple data segments across columns. The process then processes (524) the query using the composite link for parallel searching against the indexes in the group of indexes to search data segments of the columns. Processing the query uses a single searching engine to search against the indexes in the group of indexes to thereby search the data segments of the column and the one or more other columns of the database.

Although various examples are provided, variations are possible without departing from a spirit of the claimed aspects.

Figure 6:
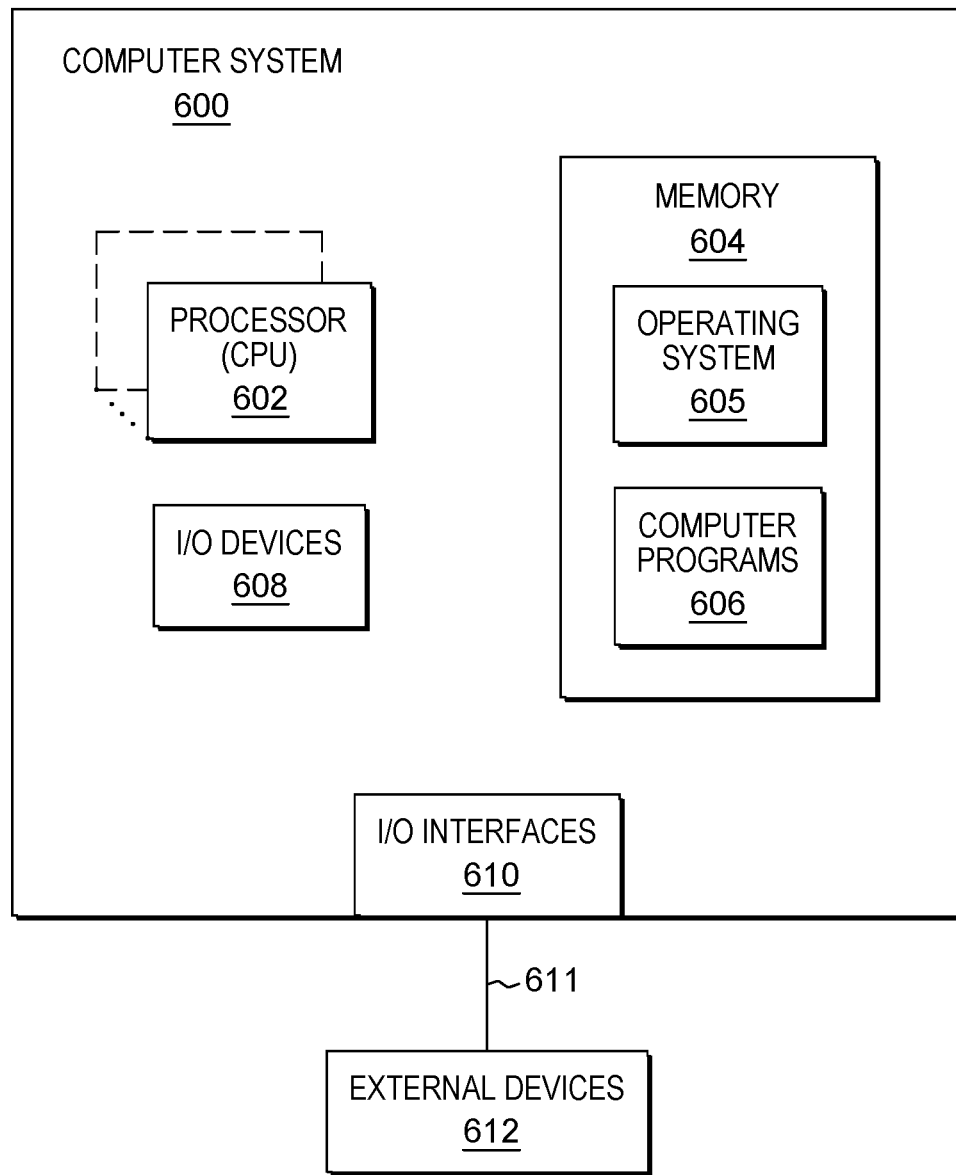
FIG. 6 depicts one example of a computer system and associated devices to incorporate and/or use aspects described herein.

Processes described herein may be performed singly or collectively by one or more computer systems, such as one or more indexers, query servers, and/or one or more other computer systems, as examples. FIG. 6 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 6 shows a computer system 600 in communication with external device(s) 612. Computer system 600 includes one or more processor(s) 602, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 602 can also include register(s) to be used by one or more of the functional components. Computer system 600 also includes memory 604, input/output (I/O) devices 608, and I/O interfaces 610, which may be coupled to processor(s) 602 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 604 can be or include main or system memory (e.g. Random Access Memory) used in the execution of program instructions, storage device(s) such as hard drive(s), flash media, or optical media as examples, and/or cache memory, as examples. Memory 604 can include, for instance, a cache, such as a shared cache, which may be coupled to local caches (examples include L1 cache, L2 cache, etc.) of processor(s) 602. Additionally, memory 604 may be or include at least one computer program product having a set (e.g., at least one) of program modules, instructions, code or the like that is/are configured to carry out functions of embodiments described herein when executed by one or more processors.

Memory 604 can store an operating system 605 and other computer programs 606, such as one or more computer programs/applications that execute to perform aspects described herein. Specifically, programs/applications can include computer readable program instructions that may be configured to carry out functions of embodiments of aspects described herein.

Examples of I/O devices 608 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (612) coupled to the computer system through one or more I/O interfaces 610.

Computer system 600 may communicate with one or more external devices 612 via one or more I/O interfaces 610. Example external devices include a keyboard, a pointing device, a display, and/or any other devices that enable a user to interact with computer system 600. Other example external devices include any device that enables computer system 600 to communicate with one or more other computing systems or peripheral devices such as a printer. A network interface/adapter is an example I/O interface that enables computer system 600 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 610 and external devices 612 can occur across wired and/or wireless communications link(s) 611, such as Ethernet-based wired or wireless connections. Example wireless connections include cellular, Wi-Fi, Bluetooth®, proximity-based, near-field, or other types of wireless connections. More generally, communications link(s) 611 may be any appropriate wireless and/or wired communication link(s) for communicating data.

Particular external device(s) 612 may include one or more data storage devices, which may store one or more programs, one or more computer readable program instructions, and/or data, etc. Computer system 600 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 600 may be operational with numerous other general purpose or special purpose computing system environments or configurations. Computer system 600 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s)

such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
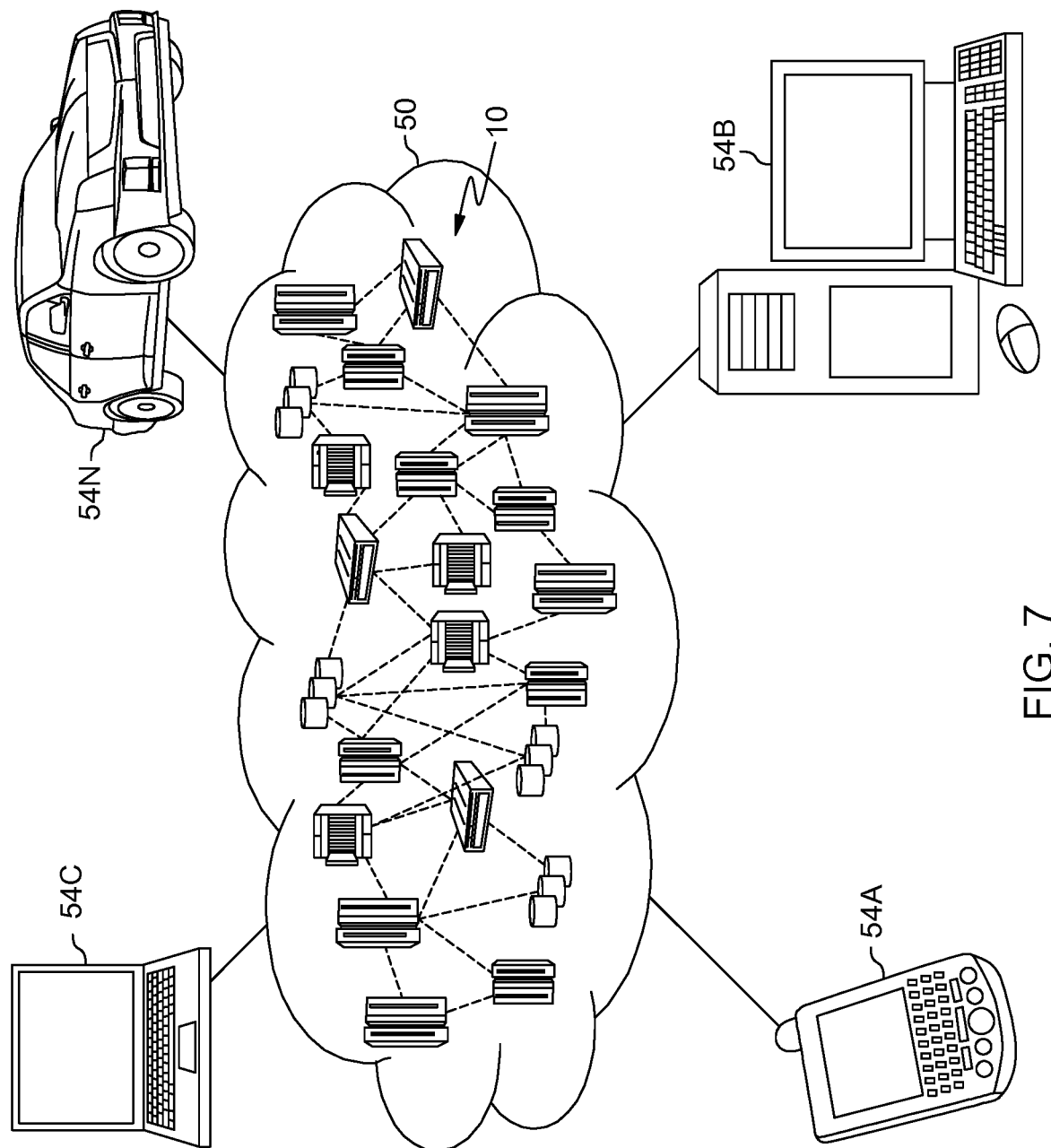
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
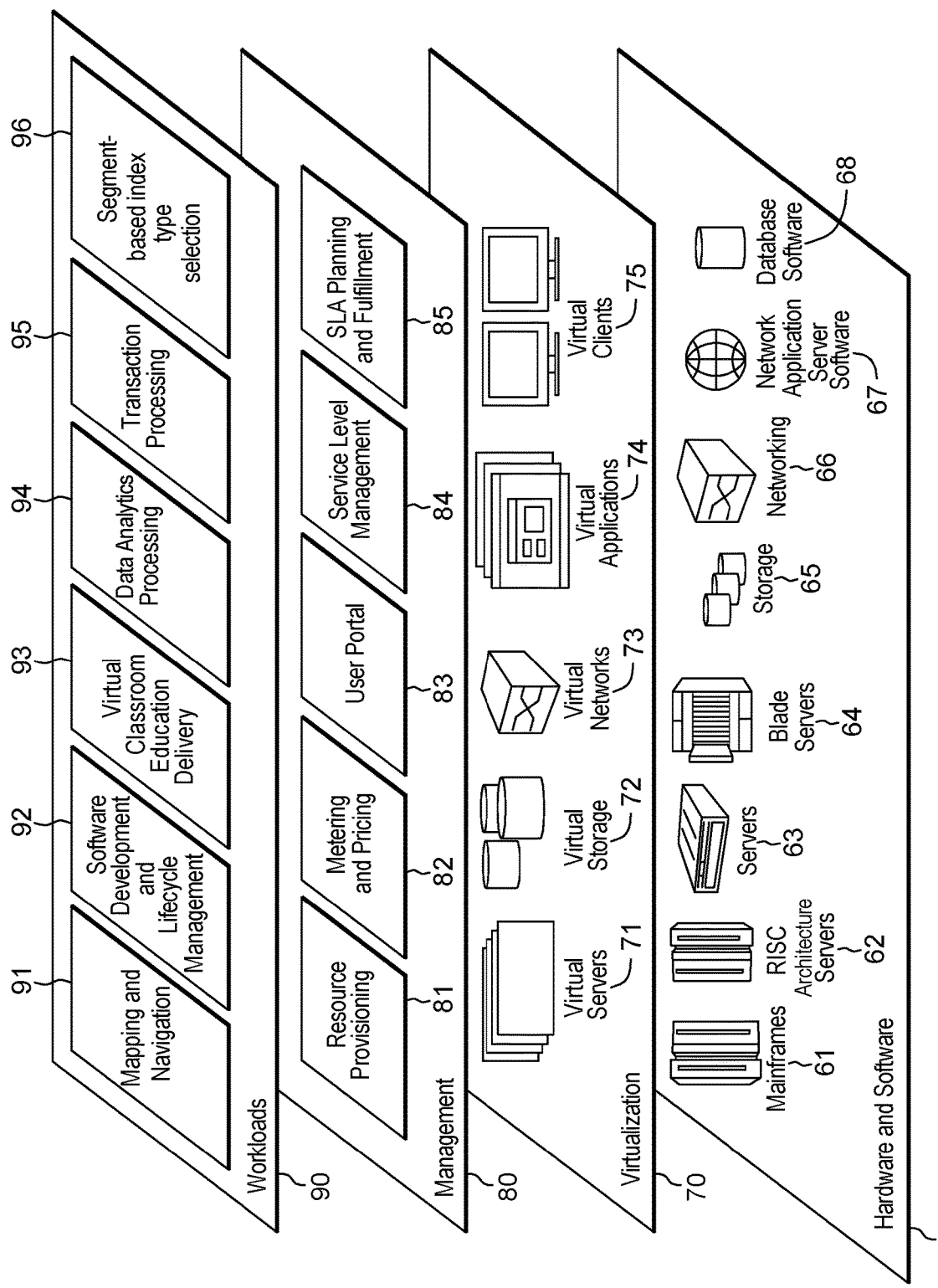
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and segment-based indexing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
    identifying data segments of a column of a database, the identifying being based on a data distribution of data of the column;
    automatically digitally indexing, by a hardware processor, the data segments of the column, the indexing comprising, for each data segment of the identified data segments of the column:
        determining an index type to use to index the data segment; and
        creating, for the data segment, an index of the determined index type to index the data segment, wherein the indexing the data segments of the column indexes a first data segment of the column, the first data segment comprising data of a particular attribute type for one or more entities, using a first index type and indexes a second data segment of the column, different from the first data segment, and comprising other data of the particular attribute type for a plurality of other entities, using a second index type that is different from the first index type; and
    building a composite link between indexes of a common index type, the indexes of the common index type comprising (i) a created index, created from the indexing the data segments of the column, of the common index type and (ii) at least one other index of the common index type, the at least one other index being for one or more other data segments, of one or more other columns of the database, that have been indexed using the common index type, wherein the composite link provides for parallel searching against the indexes of the common index type between which the composite link is built, to search corresponding different data segments, in different columns of the database, being indexed using the common index type.

2. The method of claim 1, further comprising processing a query using the composite link for parallel searching against the indexes of the common index type to search data segments of the column and the one or more other columns of the database.

3. The method of claim 2, wherein processing the query uses a single searching engine to search against the indexes of the common index type to thereby search the data segments of the column and the one or more other columns of the database.

4. The method of claim 1, wherein the indexing the data in the data segments of the column indexes the first data segment using a first index of the first index type and indexes the second data segment using a second index of the second index type, wherein the first and second indexes are different indexes.

5. The method of claim 1, wherein a user specifies an initial index type to use to index all data of the column, and wherein the indexing the data in the data segments of the column automatically creates, for a subset of the data of the column, an additional index of a different index type than the initial index type.

6. The method of claim 1, wherein the determining the index type to use to index the data segment comprises selecting, based on characteristics of the data segment, an optimal index type from a collection of available index types, the available index types being identified by machine learning, based on processing queries over time, as optimal index types to use to index data segments of differing characteristics.

7. The method of claim 1, further comprising based on changes to data of the column, the changes resulting in a changed data distribution of data of the column, reindexing a data segment of the column, wherein the reindexing determines, based at least on part on the changed data distribution, to use a different index type than a current index type being used for the data segment.

8. The method of claim 1, further comprising performing computerized query processing including the parallel searching.

9. A computer system comprising:
a memory; and
a processor in communication with the memory, wherein the computer system is configured to perform a method comprising:
identifying data segments of a column of a database, the identifying being based on a data distribution of data of the column;
automatically digitally indexing, by a hardware processor, the data segments of the column, the indexing comprising, for each data segment of the identified data segments of the column:
determining an index type to use to index the data segment; and
creating, for the data segment, an index of the determined index type to index the data segment, wherein the indexing the data segments of the column indexes a first data segment of the column, the first data segment comprising data of a particular attribute type for one or more entities, using a first index type and indexes a second data segment of the column, different from the first data segment, and comprising other data of the particular attribute type for a plurality of other entities, using a second index type that is different from the first index type; and
building a composite link between indexes of a common index type, the indexes of the common index type comprising (i) a created index, created from the indexing the data segments of the column, of the common index type and (ii) at least one other index of the common index type, the at least one other index being for one or more other data segments, of one or more other columns of the database, that have been indexed using the common index type, wherein the composite link provides for parallel searching against the indexes of the common index type between which the composite link is built, to search corresponding different data segments, in different columns of the database, being indexed using the common index type.

10. The computer system of claim 9, wherein the method further comprises processing a query using the composite link for parallel searching against the indexes of the common index type to search data segments of the column and the one or more other columns of the database.

11. The computer system of claim 10, wherein processing the query uses a single searching engine to search against the indexes of the common index type to thereby search the data segments of the column and the one or more other columns of the database.

12. The computer system of claim 9, wherein the indexing the data in the data segments of the column indexes the first data segment using a first index of the first index type and indexes the second data segment using a second index of the second index type, wherein the first and second indexes are different indexes.

13. The computer system of claim 9, wherein a user specifies an initial index type to use to index all data of the column, and wherein the indexing the data in the data segments of the column automatically creates, for a subset of the data of the column, an additional index of a different index type than the initial index type.

14. The computer system of claim 9, wherein the determining the index type to use to index the data segment comprises selecting, based on characteristics of the data segment, an optimal index type from a collection of available index types, the available index types being identified by machine learning, based on processing queries over time, as optimal index types to use to index data segments of differing characteristics.

15. The computer system of claim 9, wherein the method further comprises based on changes to data of the column, the changes resulting in a changed data distribution of data of the column, reindexing a data segment of the column, wherein the reindexing determines, based at least on part on the changed data distribution, to use a different index type than a current index type being used for the data segment.

16. A computer program product comprising:
a computer readable storage medium readable by a processing circuit and storing instructions for execution by the processing circuit for performing a method comprising:
identifying data segments of a column of a database, the identifying being based on a data distribution of data of the column;
automatically digitally indexing, by a hardware processor, the data segments of the column, the indexing comprising, for each data segment of the identified data segments of the column:
determining an index type to use to index the data segment; and creating, for the data segment, an index of the determined index type to index the data segment, wherein the indexing the data segments of the column indexes a first data segment of the column, the first data segment comprising data of a particular attribute type for one or more entities, using a first index type and indexes a second data segment of the column, different from the first data segment, and comprising other data of the particular attribute type for a plurality of other entities, using a second index type that is different from the first index type; and building a composite link between indexes of a common index type, the indexes of the common index type comprising (i) a created index, created from the indexing the data segments of the column, of the common index type and (ii) at least one other index of the common index type, the at least one other index being for one or more other data segments, of one or more other columns of the database, that have been indexed using the common index type, wherein the composite link provides for parallel searching against the indexes of the common index type between which the composite link is built, to search corresponding different data segments, in different columns of the database, being indexed using the common index type.

17. The computer program product of claim 16, wherein the method further comprises processing a query using the composite link for parallel searching against the indexes of the common index type to search data segments of the column and the one or more other columns of the database, and wherein processing the query uses a single searching engine to search against the indexes of the common index type to thereby search the data segments of the column and the one or more other columns of the database.

18. The computer program product of claim 16, wherein the indexing the data in the data segments of the column indexes the first data segment using a first index of the first index type and indexes the second data segment using a second index of the second index type, wherein the first and second indexes are different indexes.

19. The computer program product of claim 16, wherein a user specifies an initial index type to use to index all data of the column, and wherein the indexing the data in the data segments of the column automatically creates, for a subset of the data of the column, an additional index of a different index type than the initial index type.

20. The computer program product of claim 16, wherein the method further comprises based on changes to data of the column, the changes resulting in a changed data distribution of data of the column, reindexing a data segment of the column, wherein the reindexing determines, based at least on part on the changed data distribution, to use a different index type than a current index type being used for the data segment.

* * * * *